(12) United States Patent
Hazel et al.

(10) Patent No.: US 7,357,994 B2
(45) Date of Patent: Apr. 15, 2008

(54) THERMAL/ENVIRONMENTAL BARRIER COATING SYSTEM FOR SILICON-CONTAINING MATERIALS

(75) Inventors: Brian Thomas Hazel, West Chester, OH (US); Irene Spitsberg, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/160,212

(22) Filed: Jun. 14, 2005

(65) Prior Publication Data

US 2006/0280963 A1 Dec. 14, 2006

(51) Int. Cl.
*B32B 9/04* (2006.01)

(52) U.S. Cl. ............... 428/701; 428/446; 428/448; 428/697; 428/699; 428/702; 416/241 B

(58) Field of Classification Search .......... 428/446, 428/448, 697, 699, 701, 702; 416/241 B
See application file for complete search history.

(56) References Cited

U.S. PATENT DOCUMENTS

| | | | |
|---|---|---|---|
| 6,254,935 B1 | 7/2001 | Eaton et al. | 427/376.2 |
| 6,299,988 B1 | 10/2001 | Wang et al. | 428/632 |
| 6,352,790 B1 | 3/2002 | Eaton et al. | 428/689 |
| 6,365,288 B1 | 4/2002 | Eaton et al. | 428/697 |
| 6,387,456 B1 | 5/2002 | Eaton, Jr. et al. | 427/452 |
| 6,410,148 B1 | 6/2002 | Eaton, Jr. et al. | 428/446 |
| 6,444,335 B1 | 9/2002 | Wang et al. | 428/701 |
| 6,558,814 B2 * | 5/2003 | Spitsberg et al. | 428/633 |
| 6,607,852 B2 | 8/2003 | Spitsberg et al. | |
| 6,699,607 B1 * | 3/2004 | Spitsberg | 428/702 |
| 6,759,151 B1 | 7/2004 | Lee | 428/701 |
| 6,844,075 B1 | 1/2005 | Saak et al. | 428/446 |
| 2004/0028941 A1 * | 2/2004 | Lane et al. | 428/689 |
| 2004/0115471 A1 | 6/2004 | Nagaraj et al. | 428/660 |
| 2004/0175597 A1 | 9/2004 | Litton et al. | 428/702 |
| 2005/0074625 A1 | 4/2005 | Meschter et al. | 428/620 |
| 2006/0121293 A1 * | 6/2006 | Boutwell et al. | 428/469 |
| 2006/0121295 A1 * | 6/2006 | Boutwell et al. | 428/469 |
| 2006/0280954 A1 * | 12/2006 | Spitsberg et al. | 428/446 |

FOREIGN PATENT DOCUMENTS

EP 1142850 10/2001

* cited by examiner

*Primary Examiner*—John J. Zimmerman
*Assistant Examiner*—Aaron S. Austin
(74) *Attorney, Agent, or Firm*—William Scott Andes; Gary M. Hartman; Domenica N. S. Hartman

(57) ABSTRACT

A coating system for Si-containing materials, particularly those for articles exposed to high temperatures. The coating system exhibits improved resistance to corrosion from sea salt and CMAS as a result of using aluminate compounds to protect silicate-containing layers of the coating system. The coating system includes an environmental barrier coating, a thermal barrier coating overlying the environmental barrier coating and formed of a thermal-insulating material, and a transition layer between the environmental barrier coating and thermal barrier coating, wherein the transition layer contains at least one aluminate compound and/or alumina.

23 Claims, 1 Drawing Sheet

THERMAL/ENVIRONMENTAL BARRIER COATING SYSTEM FOR SILICON-CONTAINING MATERIALS

BACKGROUND OF THE INVENTION

This invention relates to coating systems suitable for protecting components exposed to high-temperature environments, such as the hot gas flow path through a gas turbine engine. More particularly, this invention is directed to a coating system that exhibits improved high temperature corrosion resistance when used to protect a silicon-containing substrate.

Higher operating temperatures for gas turbine engines are continuously sought in order to increase their efficiency. While nickel, cobalt and iron-base superalloys have found wide use for components throughout gas turbine engines, alternative materials have been proposed. In particular, silicon-based non-oxide ceramics, most notably with silicon carbide (SiC) and silicon nitride ($Si_3N_4$) as a matrix and/or reinforcing material, are candidates for high temperature applications, such as combustor liners, vanes, shrouds, airfoils, and other hot section components of gas turbine engines. However, when exposed to water-containing high temperatures such as that of a gas turbine engine, components formed of Si-based ceramics lose mass and recede because of the formation of volatile silicon hydroxide ($Si(OH)_4$). The recession rate due to volatilization or corrosion is sufficiently high in a gas turbine engine environment to require an environmentally protective coating, commonly referred to as an environmental barrier coating (EBC).

Critical requirements for an EBC intended to protect gas turbine engine components formed of a Si-based material include stability, low thermal conductivity, a coefficient of thermal expansion (CTE) compatible with the Si-based ceramic material, low permeability to oxidants, and chemical compatibility with the Si-based material and a silica scale that forms from oxidation. Silicates, and particularly barium-strontium-aluminosilicates (BSAS; $(Ba_{1-x}Sr_x)O$—$Al_2O_3$—$SiO_2$) and other alkaline earth aluminosilicates, have been proposed as EBC's in view of their environmental protection properties and low thermal conductivity. For example, U.S. Pat. Nos. 6,254,935, 6,352,790, 6,365,288, 6,387,456, and 6,410,148 to Eaton et al. disclose the use of BSAS and alkaline earth aluminosilicates as outer protective coatings for Si-based substrates, with stoichiometric BSAS (molar ratio: $0.75BaO.0.25SrO.Al_2O_3.2SiO_2$; molar percent: $18.75BaO.6.25SrO.25Al_2O_3.50SiO_2$) generally being the preferred alkaline earth aluminosilicate composition. The use of rare earth silicates in EBC's has also been proposed, as taught in U.S. Pat. No. 6,759,151 to Lee. Layers of silicon, mullite ($3Al_2O_3.2SiO_2$), and mixtures of mullite and BSAS have been proposed as bond coats to promote adhesion and limit reactions between an EBC and an underlying Si-based substrate. Commonly-assigned U.S. Pat. No. 6,844,075 to Saak et al. discloses the use of an intermediate layer of tantalum or niobium aluminate to inhibit solid-state reactions between a silicon-containing bond coat and an outer BSAS coating. Commonly-assigned U.S. Patent Application Publication No. 2005/0074625 to Meschter et al. teaches that additional aluminates can be used as an intermediate layer between a silicon-containing bond coat and an outer BSAS coating, as well as used an outer coating over a BSAS intermediate layer. If the particular component will be subjected to surface temperatures in excess of about 2500° F. (about 1370° C.), an EBC can be cooled with backside cooling of the substrate and thermally protected with an overlying thermal barrier coating (TBC) in accordance with commonly-assigned U.S. Pat. No. 5,985,470 to Spitsberg et al. In combination, these layers form what has been referred to as a thermal/environmental barrier coating (T/EBC) system.

The most commonly used TBC material for gas turbine applications is yttria-stabilized zirconia (YSZ). While exhibiting a desirable combination of properties, including low thermal conductivity, stability, good mechanical properties, and wear resistance, YSZ has a CTE mismatch with BSAS (a CTE of about 8.9-10.6 ppm/° C. for YSZ, compared to about 5.3 ppm/° C. for stoichiometric BSAS). YSZ also reacts with BSAS at temperatures greater than about 2500° F. (about 1370° C.), leading to sintering of the YSZ and a consequent loss in thermal and mechanical properties, resulting in through-thickness and horizontal cracking. To abate these problems, transition layers have been proposed containing mixtures of YSZ with alumina, mullite, and/or an alkaline earth metal aluminosilicate, as taught in commonly-assigned U.S. Pat. No. 6,444,335 to Wang et al.

While T/EBC systems as described above have significantly advanced the capability of using Si-based ceramic materials for high temperature components, further improvements would be desirable. In particular, the above-noted silicates, including BSAS and mullite, have been observed to be susceptible to corrosion promoted by contaminants such as sea salt and CMAS, the latter of which is a eutectic composition of calcia, magnesia, alumina and silica found as contaminants within a gas turbine engine during operation. Sea salt and CMAS are able to infiltrate porous TBC's, especially those deposited to have a columnar microstructure as a result of being deposited by physical vapor deposition (PVD), with the result that silicates within the transition layer and the EBC are both subject to corrosive attack. Furthermore, at temperatures exceeding about 2800° F. (about 1540° C.), BSAS and mullite-containing EBC's and transition layers have been observed to react with YSZ-containing transition layers and TBC's as a result of silica from BSAS and/or mullite gettering yttria from the YSZ-containing transition layer or TBC to form $Y_2SiO_5$, which eventually leads to spallation of the TBC and failure of the T/EBC system.

BRIEF SUMMARY OF THE INVENTION

The present invention generally provides a coating system for Si-containing materials, particularly those for articles exposed to high temperatures, including the hostile thermal environment of a gas turbine engine. Examples of such materials include silicon, silicon carbide, silicon carbide, metal silicide alloys such as niobium and molybdenum silicides, etc. More particular examples of Si-containing materials include those with a dispersion of silicon carbide, silicon carbide, and/or silicon particles as a reinforcement material in a metallic or nonmetallic matrix, as well as those having a silicon carbide, silicon nitride, and/or silicon-containing matrix, and particularly composite materials that employ silicon carbide, silicon nitride and/or silicon as both the reinforcement and matrix materials (e.g., SiC/SiC ceramic matrix composites (CMC)).

The invention is a compositionally-graded thermal/environmental barrier coating (T/EBC) system that exhibits improved resistance to corrosion from sea salt and CMAS as a result of using aluminate $((MO_x)_y(Al_2O_3)_z)$ compounds in place of silicate compounds of the prior art, and/or protecting silicate-containing layers of the coating system with aluminate-containing layers that are substantially free of silicates. The coating system includes an environmental barrier coating (EBC), a thermal barrier coating (TBC) overlying the EBC and formed of a thermal-insulating material, and a transition layer between the EBC and TBC, wherein the transition layer contains at least one aluminate compound and/or alumina.

The absence of silicates in the transition layer reduces the problem of corrosion attack of EBC from to sea salt and CMAS, thereby improving the life of the coating system. Preferred aluminates for the transition layer also have lower CTE's than preferred thermal-insulating materials for the TBC (e.g., YSZ), and provide a good CTE match for BSAS and mullite-containing EBC's. As such, a T/EBC as described above is believed to be capable of reliably providing both thermal and environmental protection to a Si-containing substrate at elevated temperatures, including temperatures in excess of 2500° F. (1370° C.), as a result of exhibiting improved corrosion resistance as compared to prior art coating systems for Si-containing materials.

Other objects and advantages of this invention will be better appreciated from the following detailed description.

DETAILED DESCRIPTION OF THE INVENTION

Figure 1:
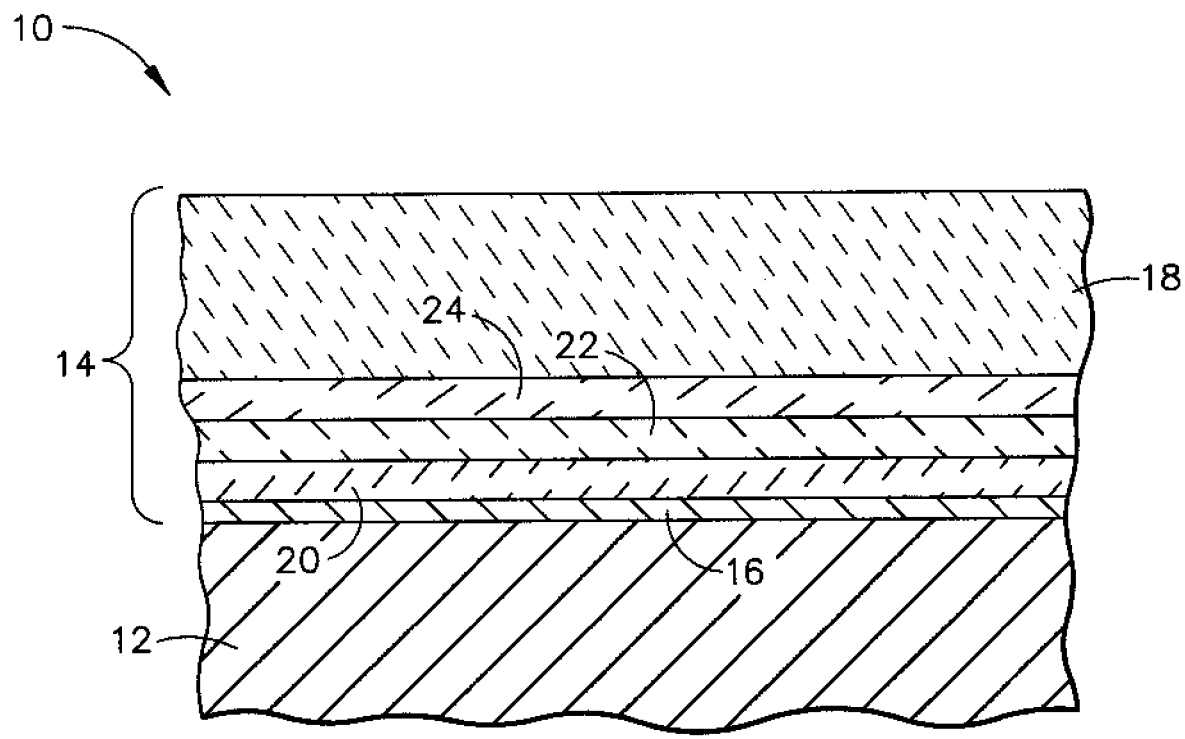
FIG. 1 schematically represents a cross-sectional view of a gas turbine engine component formed of a Si-containing material and having a thermal/environmental barrier coating system in accordance with this invention.

The present invention is generally applicable to components that operate within environments characterized by relatively high temperatures, and are therefore subjected to severe thermal cycling and stresses, oxidation, and corrosion. Notable examples of such components include combustor components, turbine blades and vanes, and other components within the hot gas flow path of gas turbine engines. A surface region 12 of a hot section component 10 is represented in FIG. 1 for purposes of illustrating the invention. The component 10, or at least the surface region 12 of the component 10, is formed of a silicon-containing material, such as a metal silicide alloy, a metal matrix composite reinforced with silicon carbide, silicon nitride, and/or silicon, a composite having a matrix of silicon carbide, silicon nitride, and/or silicon, or a composite with a silicon carbide, silicon nitride, and/or silicon matrix reinforced with silicon carbide, silicon nitride and/or silicon. However, the invention is generally applicable to other materials containing silicon in any form.

As shown in FIG. 1, the surface region 12 of the component 10 is protected by a multilayer T/EBC system 14 that includes a thermal-insulating TBC 18. The coating system 14 provides environmental protection to the underlying surface region 12 as well as reduces the operating temperature of the component 10 and interior layers 16, 20, 22, and 24 of the coating system 14, thereby enabling the component 10 to survive within higher temperature environments than otherwise possible. Suitable materials for the TBC 18 include YSZ alone or with additions of rare-earth oxides capable of reducing the CTE of the TBC 18. Preferred YSZ compositions contain, by weight, about 6 to about 8% yttria. Alternative materials for the TBC 18 include other ceramic materials known and proposed in the art for thermal barrier coatings, such as zirconate and perovskite materials. A suitable thickness range for the TBC 18 is about 50 to about 500 micrometers, with a preferred range of about 100 to about 300 micrometers, depending on the particular application.

The major mechanism for degradation of silicon carbide (as well as silicon and other silicon compounds) in a corrosive environment is the formation of volatile silicon hydroxide $(Si(OH)_4)$ products. Because the diffusivity of oxidants in materials typically suitable for use as the TBC 18 is generally very high, especially if the TBC 18 has a columnar grain structure resulting from deposition by PVD, the coating system 14 includes an environmental barrier coating (EBC) 22 that, individually and preferably in combination with the other interior layers 16, 20, and 24, exhibits low diffusivity to oxidants, e.g., oxygen and water vapor, to inhibit oxidation of the silicon within the surface region 12. Suitable compositions for the EBC 22, described in more detail below, are preferably also chemically and physically compatible with the surface region 12 to remain adherent to the region 12 under severe thermal conditions.

The innermost layers 16 and 20 of the coating system 14 serve as bond coats to adhere the EBC 22 (and, therefore, the remaining layers 24 and 18) to the surface region 12. Preferred compositions for the innermost layers 16 and 20 are silicon and mullite, respectively. In accordance with commonly-assigned U.S. Pat. No. 6,299,988 to Wang et al., the inclusion of the silicon layer 16 is useful to improve oxidation resistance of the surface region 12 and enhances bonding of the other layers 22, 24, and 18 to the surface region 12 if the surface region contains SiC or silicon nitride. A suitable thickness for the silicon layer is about 12 to about 150 micrometers. The mullite-containing layer 20 also promotes adhesion of the other layers 18, 22, and 24 to the Si-containing surface region 12, while also preventing interactions at high temperatures between the Si-containing surface region 12 and the EBC 22, particularly if the EBC 22 contains BSAS. Mullite is particularly suitable as the material for the layer 20 of the coating system 14 because of its chemical stability with Si-containing materials at high temperatures. Though the mullite-containing layer 20 can exhibit significant silica activity and volatilization if exposed to water vapor at high temperatures, preferred compositions for the EBC 22 provide the required environmental protection to avoid or at least substantially inhibit these adverse reactions. The layer 20 may also contain rare earth silicates and/or BSAS, the latter being acceptable for less demanding applications, e.g., temperatures below about 1300° C. The addition of BSAS to the layer 20 is also relatively compatible with the Si-containing surface region 12 in terms of having a CTE of about 5.3 ppm/° C., as compared to a CTE of about 4.9 ppm/° C. for SiC/SiC CMC. A suitable thickness range for the mullite-containing layer 20 is about 12 to about 150 micrometers depending on the particular application.

In accordance with the teachings of U.S. Pat. Nos. 6,254,935, 6,352,790, 6,365,288, 6,387,456, and 6,410,148 to Eaton et al., the relevant contents of which are incorporated herein by reference, preferred materials for the EBC 22 include alkaline earth metal aluminosilicates such as calcium aluminosilicates, barium aluminosilicates, strontium aluminosilicates, and more preferably BSAS. Alternatively or in addition, the EBC 22 may contain rare earth silicates in accordance with U.S. Pat. No. 6,759,151 to Lee. BSAS and particularly stoichiometric BSAS as the EBC 22 provides excellent environmental protection for the Si-containing surface region 12 as well as the underlying layers 16 and 20, as noted above. As a result, a BSAS EBC 22 is able to inhibit the growth of an interfacial silica layer at the surface region 12 when the component 10 is exposed to the oxidizing environment of a gas turbine engine. In addition, BSAS exhibits good thermal barrier properties due to its low thermal conductivity, is physically compliant with a SiC-containing substrate such as the surface region 12, and is relatively compatible with the Si-containing surface region 12 in terms of CTE. A suitable thickness range for the EBC 22 is about 25 to about 500 micrometers.

According to the invention, silicates (including mullite and rare earth silicates) and BSAS (and other alkaline earth aluminosilicates) are prone to corrosion from sea salt and CMAS. To address this problem, the present invention protects a silicate-based EBC 22 (such as that described above) with a transition layer 24 formed of a more corrosion-resistant compound. Preferred corrosion-resistant compounds are alumina ($Al_2O_3$) and aluminates, the latter of which includes such compounds as $YAlO_3$, $Y_3Al_5O_{12}$, $NbAlO_4$, $TaAlO_4$, $SrAl_2O_4$, $CaAl_2O_4$, $CaAl_4O_7$, $SrLaAlO_3$, $MgAl_2O_4$, $ScAlO_3$, and aluminates such as aluminates of lanthanum, dysprosium, holmium, erbium, thulium, ytterbium, and lutetium. As compared to silicates such as mullite and BSAS, alumina and particularly aluminates offer better resistance to corrosion attack from sea salt and CMAS while also exhibiting a potentially higher temperature capability and low chemical interaction with BSAS. Though alumina is known to be subject to corrosive attack from molten salts, the recession rate is significantly lower than silica. Furthermore, previous work by others has shown that alumina corrosion is initiated by silica impurities in the alumina, and the corrosion rate decreases by the purity of the alumina. Alumina has also been shown to have little or no solubility with YSZ, and is therefore expected to be able to survive higher temperature exposure while contacting a TBC containing YSZ.

Depending on the particular corrosion-resistant compound(s) used, the transition layer 24 can be partially or entirely formed of the corrosion-resistant compound(s). For example, the transition layer 24 can be formulated as a mixture of one or more of the above-noted corrosion-resistant compounds with the same insulating material used to form the TBC 18, such as YSZ. The EBC 22 may also be formulated to contain one or more of the above-noted corrosion-resistant compounds. A suitable thickness range for the transition layer 24 is up to about 500 micrometers, depending on the particular application and the compositions and thicknesses of the other layers 16, 18, 20, and 22 of the T/EBC system 14. Preferred compositions and thicknesses for the transition layer 24 will depend at least in part on the CTE's of the other layers in the coating system 14 and the CTE of the corrosion-resistant material(s) used, for example: $Al_2O_3$ about 7.2-8.6 ppm/° C., $YAlO_3$ about 5.6 ppm/° C., $Y_3Al_5O_{12}$ about 9 ppm/° C., $NbAlO_4$ about 6.3 ppm/° C., $TaAlO_4$ about 5.6 ppm/° C., $CaAl_4O_7$ about 4.8 ppm/° C., $SrLaAlO_3$ about 4.7 ppm/° C., and $MgAl_2O_4$ about 7.5 ppm/° C. In comparison, the CTE's of SiC, mullite, BSAS, and 7% YSZ are about 4.3-5.5, 5.3, 5.5, and 8.9-10.6 ppm/° C., respectively. From this list, it can be appreciated that a transition layer 24 can be formed entirely of one or more of these corrosion-resistant compounds whose CTE is between that of an EBC 22 formed of BSAS and a TBC 18 formed of 7% YSZ. It is further evident that the transition layer 24 can be omitted if the EBC 22 layer is formed entirely of one or more of these corrosion-resistant compounds having a CTE between that of the mullite-BSAS bond layer 20 and a TBC 18 formed of YSZ.

To provide a suitable level of corrosion protection, the corrosion-resistant compounds of this invention preferably constitute at least 50 weight percent and more preferably at least about 90 weight percent of the transition layer 24. In a preferred embodiment, the corrosion-resistant compound forms the entire transition layer 24. The amount of the corrosion-resistant compounds present in the transition layer 24 may be limited as necessary to provide a suitable CTE transition between the TBC 18 and the remaining layers of the coating system 14. Based on results with a transition layer disclosed in commonly-assigned U.S. Pat. No. 6,444,335 to Wang et al. that contains a 1:1 weight ratio of mullite and YSZ to yield a CTE of about 7 to 8 ppm/° C., it is believe that a particularly suitable transition layer 24 for the present invention should have a similar CTE. For example, $CaAl_4O_7$ mixed with YSZ at a weight ratio of 1:1 would yield a CTE of about 7 ppm/° C.

A transition layer 24 containing a mixture of a corrosion-resistant material and another compound (e.g., YSZ) can be a substantially homogeneous mixture, or can be made up of discrete sublayers, each with a different composition. For example, in a transition layer 24 containing YSZ and one or more of the corrosion-resistant compounds of this invention, the composition of a sublayer contacting the EBC 22 could consist essentially of the corrosion-resistant material(s), while an outermost sublayer contacting the TBC 18 could consist essentially of YSZ, with one or more intermediate sublayers preferably present and having compositions that are intermediate those of the inner and outer sublayers. Alternatively, the transition layer 24 can have a continuously changing composition, from essentially all alumina and/or aluminate adjacent the EBC 22 to essentially all YSZ adjacent the TBC 18. In such an embodiment, the transition layer 24 has a decreasing concentration of corrosion-resistant compounds and an increasing concentration of YSZ in a direction away from the EBC 22. In combination, the higher concentration of corrosion-resistant compounds adjacent the EBC 22 and the higher concentration of YSZ adjacent the TBC 18 serve to provide a gradually increasing CTE, with a minimum CTE adjacent the EBC 22 and a maximum CTE adjacent the TBC 18.

In view of the above, it is envisioned that the T/EBC system 14 of this invention can be constructed as a five-layer system that includes a first bond layer 16 formed of silicon, a second bond layer 16 formed of a mixture of mullite and BSAS, an EBC 22 formed of an alkaline earth metal aluminosilicate (e.g., BSAS), a rare earth silicate, and/or another suitable EBC material, a TBC 18 formed of YSZ or another suitable TBC material, and a transition layer 24 between the EBC 22 and TBC 18 and containing one or more of the corrosion-resistant compounds and optionally the same thermal insulating material used to form the TBC 18. Alternatively, the T/EBC system 14 of this invention can be constructed as a four-layer system by forming the transition layer 24 entirely of one or more of the corrosion-resistant compounds, permitting the EBC 22 to be optional. In each of these examples, the use of alumina and/or aluminates within the transition layer 24 is believed to promote the ability of the EBC 22 to resist corrosion attack by sea salt and CMAS, as well as thermally and environmentally protect the underlying bond layers 16 and 20 and the Si-containing surface region 12 over numerous thermal cycles and at elevated temperatures.

As with prior art bond coats and environmental coatings, the layers 16, 20, 22, and 24 of the coating system 14 can be individually deposited by air and vacuum plasma spraying (APS and VPS, respectively), though it is foreseeable that deposition could be performed by other known techniques, such as chemical vapor deposition (CVD) and high velocity oxy-fuel (HVOF). The TBC 18 can also be deposited by known techniques such as plasma spraying and PVD techniques, the latter of which to obtain a columnar grain structure. Thereafter, a heat treatment may be performed after deposition of the individual layers 16, 20, 22, and 24 and/or TBC 18 to relieve residual stresses created during cooling from elevated deposition temperatures.

While our invention has been described in terms of a preferred embodiment, it is apparent that other forms could be adopted by one skilled in the art. Accordingly, the scope of our invention is to be limited only by the following claims.

What is claimed is:

1. A coating system on an article having a substrate formed of a silicon-containing material, the coating system comprising:
   a silicate-containing coating overlying the substrate and containing at least one silicate susceptible to corrosion;
   a thermal barrier coating overlying the silicate-containing coating and formed of a thermal-insulating material having a coefficient of thermal expansion (CTE) different than the silicate-containing coating; and
   a transition layer between the silicate-containing coating and the thermal barrier coating, the transition layer providing corrosion protection to the at least one silicate of the silicate-containing coating and providing a CTE mismatch-abating transition between the silicate-containing coating and the thermal barrier coating, the transition layer being free of silicates and consisting essentially of at least one aluminate compound and optionally containing the thermal-insulating material and/or alumina, the at least one aluminate compound being chosen from the group consisting of $YAlO_3$, $Y_3Al_5O_{12}$, $NbAlO_4$, $TaAlO_4$, $SrAl_2O_4$, $CaAl_2O_4$, $CaAl_4O_7$, $SrLaAlO_3$, $MgAl_2O_4$, $ScAlO_3$, and rare earth aluminate compounds:
   wherein to enable the transition layer to provide a CTE mismatch-abating transition between the silicate-containing coating and the thermal barrier coating, the transition layer:
      consists essentially of the at least one aluminate compound and the CTE of the transition layer is a value between the CTE's of the thermal-insulating material and the silicate-containing coating; or
      is a substantially homogeneous mixture consisting essentially of the at least one aluminate compound and at least one of the thermal-insulating material and the alumina, and the CTE of the transition layer is a value between the CTE's of the thermal-insulating material and the silicate-containing coating; or
      is a compositionally graded mixture consisting essentially of the at least one aluminate compound and at least one of the thermal-insulating material and the alumina, and has a gradually increasing CTE with a minium CTE value adjacent the silicate-containing coating and a maximum CTE value adjacent the thermal barrier coating.

2. A coating system according to claim 1, wherein the substrate is formed of a material selected from the group consisting of metal silicide alloys, metal matrix composites reinforced with silicon carbide, silicon nitride and/or silicon, composites having a matrix of silicon carbide, silicon nitride and/or silicon, and composites with a silicon carbide, silicon nitride and/or silicon matrix reinforced with silicon carbide, silicon nitride and/or silicon.

3. A coating system according to claim 1, further comprising at least one bond coat layer on the substrate, the at least one bond coat layer being formed of at least one of silicon, silicates, and/or mixtures of silicates and aluminosilicates.

4. A coating system according to claim 1, wherein the transition layer contains by weight at least 50% of the at least one aluminate compound.

5. A coating system according to claim 1, wherein the transition layer contains by weight at least 90% of the at least one aluminate compound.

6. A coating system according to claim 1, wherein the transition layer contacts the silicate-containing coating and the thermal barrier coating.

7. A coating system according to claim 1, wherein the transition layer consists of the at least one aluminate compound, the thermal-insulating material of the thermal barrier coating, and alumina.

8. A coating system according to claim 1, wherein the silicate-containing coating contains an alkaline earth metal aluminosilicate.

9. A coating system according to claim 1, wherein the silicate-containing coating consists essentially of barium strontium aluminosilicate.

10. A coating system according to claim 1, wherein the silicate-containing coating contains at least one aluminate compound.

11. A coating system according to claim 1, wherein the transition layer consists of the at least one aluminate compound.

12. A coating system according to claim 1, wherein the transition layer consists of the thermal-insulating material of the thermal barrier coating and the at least one aluminate compound.

13. A coating system according to claim 12, wherein the thermal-insulating material of the thermal barrier coating consists essentially of yttria-stabilized zirconia optionally with additions of one or more rare earth oxides.

14. A coating system according to claim 1, wherein the thermal barrier coating consists essentially of yttria-stabilized zirconia optionally with additions of one or more rare earth oxides.

15. A coating system according to claim 1, wherein the transition layer is the substantially homogeneous mixture.

16. A coating system according to claim 1, wherein the transition layer is the compositionally graded mixture.

17. A coating system according to claim 1, wherein the article is a component of a gas turbine engine.

18. A gas turbine engine component comprising:
   a substrate formed of a silicon-containing material;
   at least one silicon-containing bond coat on the substrate;
   an environmental barrier coating on the bond coat and containing at least one silicate susceptible to corrosion;
   a thermal barrier coating overlying the environmental barrier coating, the thermal barrier coating being formed of a thermal-insulating material having a coefficient of thermal expansion (CTE) different than the environmental barrier coating and having a columnar microstructure; and a transition layer between and contacting the environmental barrier coating and the thermal barrier coating, the transition layer providing corrosion protection to the at least one silicate of the environmental barrier coating and providing a CTE mismatch-abating transition between the environmental barrier coating and the thermal barrier coating, the transition layer being free of silicates and consisting essentially of at least one aluminate compound and optionally the thermal-insulating material of the thermal barrier coating, the at least one aluminate compound being chosen from the group consisting of YAlO$_3$, Y$_3$Al$_5$O$_{12}$, NbAlO$_4$, TaAlO$_4$, SrAl$_2$O$_4$, CaAl$_2$O$_4$, CaAl$_4$O$_7$, SrLaAlO$_3$, MgAl$_2$O$_4$, ScAlO$_3$, and rare earth aluminate compounds:

wherein to enable the transition layer to provide a CTE mismatch-abating transition between the environmental barrier coating and the thermal barrier coating, the transition layer:

consists essentially of the at least one aluminate compound and the CTE of the transition layer is a value between the CTE's of the thermal-insulating material and the environmental barrier coating; or is a substantially homogeneous mixture consisting essentially of the at least one aluminate compound and at least one of the thermal-insulating material and the alumina, and the CTE of the transition layer is a value between the CTE's of the thermal-insulating material and the environmental barrier coating; or is a compositionally graded mixture consisting essentially of the at least one aluminate compound and at least one of the thermal-insulating material and the alumina, and has a gradually increasing CTE with a minimum CTE value adjacent the environmental barrier coating and a maximum CTE value adjacent the thermal barrier coating.

19. A gas turbine engine component according to claim 18, wherein the transition layer consists of the at least one aluminate compound.

20. A gas turbine engine component according to claim 18, wherein the environmental barrier coating consists essentially of barium strontium aluminosilicate.

21. A coating system according to claim 1, wherein the transition layer consists of the at least one aluminate compound and alumina.

22. A gas turbine engine component according to claim 18, wherein the transition layer is the substantially homogeneous mixture of the at least one aluminate compound and the thermal-insulating material.

23. A gas turbine engine component according to claim 18, wherein the transition layer is the compositionally graded mixture of the at least one aluminate compound and the thermal-insulating material.

* * * * *